US008215057B2

(12) United States Patent
Rosenberg

(10) Patent No.: US 8,215,057 B2
(45) Date of Patent: *Jul. 10, 2012

(54) CALYX SUPPORT FOR STEMMED FLOWERS

(76) Inventor: Paul H. Rosenberg, Fort Lee, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/184,763

(22) Filed: Jul. 18, 2011

(65) Prior Publication Data
US 2011/0272534 A1    Nov. 10, 2011

Related U.S. Application Data

(63) Continuation of application No. 12/576,990, filed on Oct. 9, 2009, now Pat. No. 7,980,026.

(51) Int. Cl.
A01G 5/06 (2006.01)
(52) U.S. Cl. ....................................... 47/41.15
(58) Field of Classification Search .................. 47/41.15
See application file for complete search history.

(56) References Cited

U.S. PATENT DOCUMENTS

| 2,273,368 | A |   | 2/1942  | Mumford |        |
|-----------|---|---|---------|---------|--------|
| 2,641,086 | A |   | 6/1953  | Shinoda |        |
| 3,177,108 | A |   | 4/1965  | Waszkiewicz |    |
| 3,928,936 | A |   | 12/1975 | Wollen  |        |
| D308,029  | S |   | 5/1990  | Kladt   |        |
| 5,060,417 | A | * | 10/1991 | Court   | 47/41.15 |
| 5,099,604 | A |   | 3/1992  | Gallo   |        |
| 5,293,713 | A |   | 3/1994  | Ahmed   |        |
| 6,393,761 | B1|   | 5/2002  | Deaon   |        |
| D505,641  | S |   | 5/2005  | Kaffman et al. |  |
| 7,980,026 | B2| * | 7/2011  | Rosenberg | 47/41.15 |

FOREIGN PATENT DOCUMENTS
EP       0095385       5/1983
WO   WO 2006045812 A1 *   5/2006

* cited by examiner

Primary Examiner — Frank T Palo
(74) Attorney, Agent, or Firm — Arthur Yang; Hoxie & Associates LLC

(57) ABSTRACT

An apparatus for supporting the calyx of a flower of a plant having a lockable stem clip from which extend projections for supporting the calyx of the flower.

8 Claims, 1 Drawing Sheet

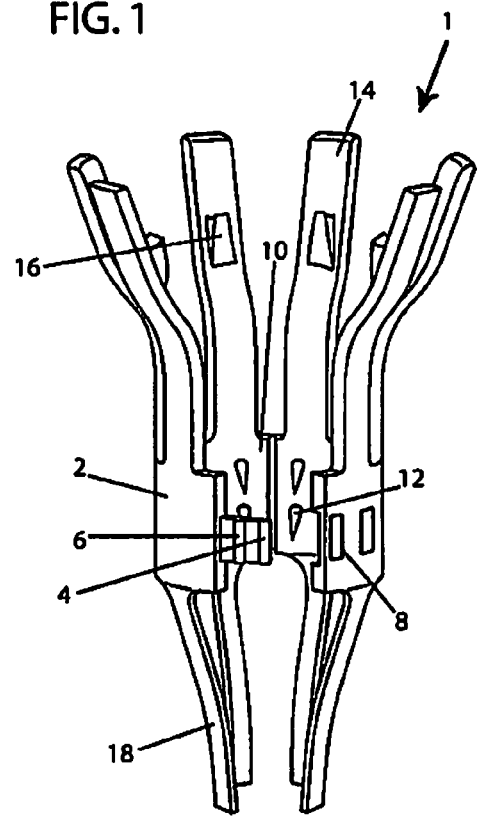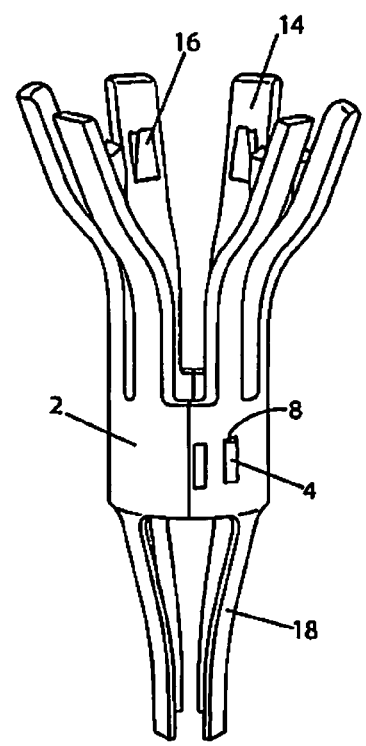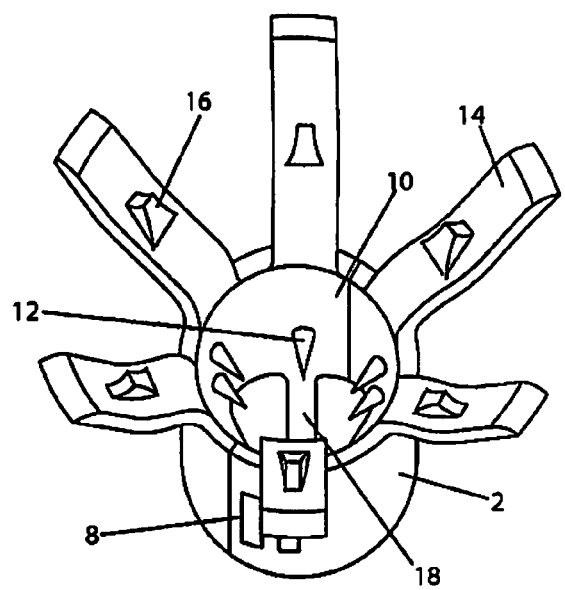

CALYX SUPPORT FOR STEMMED FLOWERS

CROSS REFERENCE TO RELATED APPLICATIONS

This application is a continuation of U.S. patent application Ser. No. 12/576,990 filed Oct. 9, 2009, now U.S. Pat. No. 7,980,026, the contents of which are incorporated herein by reference.

FIELD OF THE INVENTION

The present invention relates to a support clip for a flower located at the end of a stem. More specifically, a lockable clip is configured for attachment to and for supporting the stem of a flower, and contains a number of calyx support extensions that extend above the clip to also support the head of the flower.

BACKGROUND OF THE INVENTION

People use flowers to express their feelings, enhance their surroundings, and to commemorate important rituals and observances. However, flowers are perishable, especially after they are cut for sale. Thus, it is important to maintain their look as fresh and natural as possible to maximize the enjoyment and use of the cut flowers.

In most varieties of flowers, the proximal stem is adapted to provide both nutrients and support to the flower. As is well known, the xylem and phloem of the stem provide a nutrient transport system to the flower. However, when the flower head droops, this nutrient transport system may be cut off, which accelerates the degeneration of the petals. Similarly, the calyx of the plant provides support for the petals. In some varieties, the calyx is relatively heavy and sturdy, which provides significant support for the petals of the flower and extends the potential useful life for cut flowers. In other varieties of flowers, the position and quality of the calyx is such that it provides practically no support to the petals. Because a flower is relatively delicate, it is desirable to provide a flower support that is easily attached to the stem without damaging the plant, and also provides sufficient support to the stem, calyx and/or the petals so as to maintain and extend the desirable appearance of the flower.

It is with these considerations in mind the present invention is contemplated.

BRIEF DESCRIPTION OF THE DRAWINGS

The foregoing and other features of the present invention will be more readily apparent from the following detailed description and drawings of the illustrative embodiments of the invention in which:

FIG. 1 is a front view of one embodiment of the present invention with the clip in the open position;

FIG. 2 is a front view of one embodiment of the present invention with the clip in the closed or locked position; and FIG. 3 is a top view of one embodiment of the present invention.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Flower support 1 is shown in FIGS. 1 through 3. Flower support 1 is comprised of stem clip 2, calyx supports 14, and grip braces 18. Stem clip 2 is generally cylindrical and may be made of any type of plastic, rubber or similar material in which the clip may be opened, placed around the stem of a flowering plant, and then closed again to at partially enclose around the stem. Stem clip 2 provides support for the proximal stem of the flower, that is, the portion of the stem adjacent to the flower head. This support prevents premature degradation of the nutrient transport system of the stem, and prolongs the useful life of the flower. Stem clip 2 contains an opening along its periphery that may be locked in a closed position through the use of a locking feature. In one embodiment, the locking feature consists of locking projection 4 that has one or more ratchets 6. When locking projection 4 is inserted into locking recess 8, ratchets 6 engage locking recess 8 to hold the clip in its closed position. In another embodiment, several ratchets 6 are located on locking projection 4 so that the inner circumference of stem clip 2 may be closely approximated to the outer diameter of the stem. In other words, as the diameter of stem clip 2 is reduced during closing of the stem clip, successive ratchets will engage in locking recess 8 depending on the size of the stem that is being encircled by the stem clip. Other methods of locking stem clip 2 in the closed position around a stem may be used such as a locking strap, a tie-like structure or similar methods. In yet another embodiment, stem clip 2 may be comprised of a flexible material that substantially maintains its shape. The opening extends completely from one end of the clip to the other end and thus the clip forms a "C" shape when viewed in cross-section. The clip may be placed onto the stem of a plant by pushing the stem through the opening of the clip. Since the clip is made of a flexible material, it will expand to allow the stem to be inserted and then immediately close around the stem to hold it in place.

On the side opposite the opening, stem clip 2 may contain a living hinge that allows the clip to be opened and closed more easily. In another embodiment, instead of having a hinge, the entire stem clip 2 is made of a semi-flexible material. Stem clip 2 may have inner wall 10 with stem gripping projections 12 extending inwardly. Stem gripping projections 12 hold stem clip 2 in place on the stem, and may prevent the clip from sliding either upwards or downwards. Stem gripping projections 12 may, in one example, be angled downwards relative to calyx supports 14. In that instance, when stem clip 2 is placed on the stem of the plant, it may be slid upwards towards the flower but not in the opposite direction because stem gripping projections 12 engage when stem clip 2 is moved downwards. This permits stem clip 2 to be properly positioned and held in place just below the calyx of the flower. Stem gripping projections may be configured to have a length short enough to prevent damage to the plant, such that they would not puncture the xylem and phloem. In another embodiment, stem gripping projections 12 may be blunted so that the stem is not punctured when stem clip 2 is tightened around the stem of the plant. In yet another embodiment, stem gripping projections 12 may consist of one or more circular or partially circular ridges with a leading edge angled downward so that the clip may only be slid upwards on the stem of the plant. In this embodiment, the circular ridges should be dimensioned so as not to interfere with the nutrient transport system of the stem when the stem clip is tightened around the stem.

Calyx supports 14 are attached to one end of stem clip 2 and extend in a longitudinal direction along the axis of stem clip 2 as well as radially outward from the central axis of stem clip 2. Calyx supports 14 are configured to support either the calyx of the flower or the petals of the flower. Calyx supports 14 may also have calyx gripping extensions 16 that engage with the calyx of the plant when flower support 1 is put into place.

On the opposite end from calyx supports 14 are grip braces 18. These extensions are attached to stem clip 2 and run in the opposite direction from calyx supports 14. Grip braces 18 provide additional support for stem clip 2 along the stem to both hold it in place and prevent it from sliding down the plant. Grip braces 18 may also contain projections or similar features to prevent flower support 1 from moving out of position.

In operation, stem clip 2 is biased open, placed around the stem and then closed so that locking projection 4 engages with locking recess 8. Stem clip 2 is closed until inner wall 19 is in close engagement with the outer wall of the stem. Stem gripping projections 12 may hold stem clip 2 in place on the stem. If stem clip 2 is not initially placed around the stem of the plant in the proper vertical position, stem clip 2 may be slid upwards toward the calyx of the plant to a point in which calyx supports 14 come in close contact with either the calyx or the petals of the flower. Calyx gripping extensions 16 may then engage the calyx of the plant to hold it in place. Because stem gripping projections 12 on inner wall 10 are downwardly angled, stem clip 2 is able to slide upward on the stem but not downwards. Thus, flower support 1 may be placed in the proper position very easily.

The benefit of flower support 1 is that it extends the useful life of cut flowers because it supports either the calyx or the petals of the flower in place for a greater period of time than would normally occur.

While the invention has been particularly shown and described with reference to preferred embodiments thereof, it would be understood by those skilled in the art that various changes in form and details may be made therein without departing from the spirit and scope of the invention.

What is claimed as new and desired to be protected is:

1. A support for a flower located on a stem of a plant comprising:
   a flexible and substantially cylindrical stem clip having a first and second end and an opening allowing for the clip to be placed around the stem of a plant to surround the stem in close contact; and
   two or more calyx supports attached to the first end of the clip, with the calyx supports extending longitudinally along and radially outward from a center axis of the stem clip.

2. The support for a flower of claim 1, further comprising:
   an outer wall having an inner peripheral surface with one or more gripping projections.

3. The support for a flower of claim 1, further comprising:
   grip braces attached to the second end of the clip and extending longitudinally along a center axis of the clip in a direction opposite to the calyx supports.

4. The support for a flower of claim 1, further comprising:
   an outer wall with a locking feature having a locking projection.

5. The support for a flower of claim 1, wherein the calyx supports have calyx gripping extensions for holding the calyx supports against the calyx of the flower.

6. A support for a flower comprising:
   a substantially cylindrical stem clip formed from a flexible material with an opening extending a longitudinal direction from a first end of the clip to a second end of the clip;
   the cylindrical stem clip having an inner peripheral surface with at least one grippling projection for gripping the stem of a plant; and
   a calyx support attached to the first end of the clip and extending both in the longitudinal direction and radially outward from a central axis of the stem clip.

7. The support for a flower of claim 6 further comprising:
   grip braces attached to the second end of the clip and extending longitudinally along the center axis of the clip in a direction opposite to the calyx support.

8. The support for a flower of claim 6, wherein the calyx support has calyx gripping extensions for holding the calyx supports against the calyx of the flower.

* * * * *